United States Patent [19]

Lee

[11] Patent Number: 5,288,443
[45] Date of Patent: Feb. 22, 1994

[54] MOLD RELEASE AGENT FOR CERAMIC MOLDS USED IN CERAMIC SLIP CASTING PROCESSES

[75] Inventor: Howard H.-D. Lee, Bloomfield Hills, Mich.

[73] Assignee: General Motors Corporation, Detroit, Mich.

[21] Appl. No.: 996,532

[22] Filed: Dec. 24, 1992

[51] Int. Cl.$^5$ .............................................. C04B 33/28
[52] U.S. Cl. ........................................ 264/56; 264/86; 264/338; 249/115
[58] Field of Search .......................... 264/86, 338, 56; 249/115

[56] References Cited

U.S. PATENT DOCUMENTS

| | | | |
|---|---|---|---|
| 2,498,149 | 2/1950 | Bower | 249/115 |
| 3,641,229 | 2/1972 | Lawrence et al. | 264/86 |
| 5,156,856 | 10/1992 | Iwasaki | 264/86 |

OTHER PUBLICATIONS

James et al., Paper Pulp Linings for Mold Release In Ceramic Bulletin, pp. 712–713, vol. 42, No. 11 (1963).
Coffin, "A Permeable Ceramic Mold Material", Ceramic Bulletin, vol. 45, No. 11 (1966) pp. 1014–1016.
Cowan, "Slip Casting", Treatise on Materials Science and Technology, vol. 9, Ceramic Fabrication Processes (1976), pp. 153–159.
Richerson, "Modern Ceramic Engineering", pp. 193–197.

*Primary Examiner*—James Derrington
*Attorney, Agent, or Firm*—George A. Grove

[57] ABSTRACT

A mold release agent is provided which is compatible for use with slip casting molds formed from alumina, which are more durable than conventional gypsum molds. The preferred mold release agent is a suspension whose suspended solid matter is water-insoluble, organic, and composed of fine natural or synthetic powders or fibers. The mold release agent forms a layer of particles and/or fibers on the mold cavity surface which promotes the ease by which the cast article can be removed from the alumina mold. The mold release agent is readily burned out during subsequent firing or sintering operations, so as not to leave an undesirable residue in the surface of the fired or sintered ceramic article. Furthermore, the mold release agent does not have an undesirable effect on the microstructure of the as-cast or sintered ceramic article, nor does its use result in any detectible surface or internal cracks in the as-cast or sintered ceramic article.

7 Claims, No Drawings

MOLD RELEASE AGENT FOR CERAMIC MOLDS USED IN CERAMIC SLIP CASTING PROCESSES

The present invention generally relates to slip casting processes used to form ceramic articles. More particularly, this invention relates to a slip casting process involving the use of an absorbent ceramic mold and a mold release agent which is compatible with such a ceramic mold, wherein the preferred mold release agent is a suspension of water-insoluble organic solid materials.

BACKGROUND OF THE INVENTION

Ceramic slip casting is a known process by which ceramic powders can be used to produce a desired net shape cast ceramic article. In comparison to other ceramic forming processes (e.g., dry pressing, injection molding and high-energy impacting), intricate net shape articles can be formed by the slip casting process at relatively low production costs. The slip casting process generally involves forming a stable aqueous dispersion of ceramic powders, with the aqueous component most often being water. The aqueous dispersion, referred to as a slip, is then poured into the cavity of a porous mold. The liquid component of the slip is absorbed by the porous mold, leaving the ceramic powder component of the slip in the cavity to form the shaped article. Once the shaped article is sufficiently dry, it is removed from the mold cavity. To facilitate removal, it is typically necessary to apply a mold release agent on the surfaces of the mold cavity.

Both hollow and solid articles can be formed by slip casting processes. Solid articles are formed by allowing the entire slip mass to dry within the cavity, while hollow articles require draining the excess slip from the cavity after sufficient time has passed, so as to form a suitably thick dry ceramic layer on the wall of the cavity. After slip casting, the shaped article conventionally undergoes a firing or sintering operation so as to fuse and/or react the ceramic powder, thus forming a strong and dense solid ceramic article.

Molds for slip casting preferably have controlled porosity so as to facilitate removal of the liquid from the slip by capillary action. Gypsum ($CaSO_4 \cdot 2H_2O$) is widely used for making porous molds for slip casting processes. Through gypsum molds are suitable for general slip casting processes, they have pores which are not generally uniform, ranging in size between about 0.4 and about 5 micrometers, with the bulk of the pores being about 1 to 2 micrometers. In addition, gypsum molds are typically delicate and susceptible to wear, resulting in a shortened service life.

Gypsum is also known to dissolve in acids and ammonium ($NH_4$) salts and, further, is soluble in water at about 0.241 grams per 100 ml. As a result, the cavity surface of a gypsum mold will eventually become deteriorated by the aqueous medium of the slip. In addition, when slips are stabilized in an acidic or basic solution for purposes of dispersing the ceramic particles within the aqueous solution, deterioration of gypsum molds has been found to be even more severe since the acid that accumulates on the mold surface during the casting operation reacts with the gypsum. Accordingly, an alternative mold material has been sought by the casting industry.

The use of porous ceramic molds has been previously suggested for use as investment casting molds. Ceramic molds are advantageous in that they are typically strong, have long service life and are substantially non-reactive with aqueous components used in slip compositions. However, the use of a porous ceramic mold for a slip casting process requires a different mold release agent due to the different composition, porosity and surface characteristics of ceramic molds, as compared to gypsum molds.

Generally, mold release agents must be compatible with the mold material and prevent the slip from adhering to the mold cavity. In addition, mold release agents must not adversely effect the final properties of a cast ceramic article, which may occur as a result of the slip being in direct contact with the mold release agent during the molding process. This is particularly true when submicron ceramic powders are intended to be used in the slip casting process. Ceramic articles formed from submicron ceramic powders are desirable in that they are more capable of being sintered to full density at relatively low temperatures as compared to ceramic articles formed from larger-sized particles. However, the submicron particles tend to be more adherent to the molds, thus requiring more stringent control over the materials, porosity and surface features of the mold release agent and mold.

As an example, undesirable flocculation of the slip may occur, wherein the ceramic particles tend to clump together, thereby resulting in an inferior non-uniform dispersion of the ceramic particles throughout the slip. In addition, during the subsequent sintering of the cast article, unwanted residue due to the mold release agent on the surface of the sintered article may produce undesirable changes in the microstructure of the sintered article and/or detrimentally affect the physical properties of the sintered object.

Conventionally, ammonium alginate ($C_6H_7O_6 \cdot NH_4$) mold release agents have been used satisfactorily with gypsum molds. Ammonium alginate-type mold release agents are dissolved in water to form a solution. The solution is then poured into the mold cavity and allowed to sit for a duration which is sufficient to form a continuous film on the surface of the mold cavity, with a portion of the solution being adsorbed into the mold. The excess solution is then drained out of the mold cavity. The continuous thin film serves as a permeable barrier layer between the slip and the gypsum mold, so as to promote release of the cast article afterward while also allowing passage of the water within the slip through to the porous ceramic mold.

However, it has been determined that ammonium alginate-type mold release agents do not perform well with ceramic molds. This is primarily because the cast articles do not easily release from the mold cavity. The reason for this is believed to be that, while ammonium alginate-type mold release agents are compatible with gypsum molds, they are generally incompatible with ceramic molds due to a ceramic mold's different chemistry and pore structure. Other known mold release agents, such as silicone, graphite, oxides, talc, olive oil and spray starch, have also been determined to be unsuited or otherwise less than optimal for use with ceramic molds.

Thus, it would be desirable to provide a mold release agent which would permit the use of a porous ceramic mold in a slip casting process, wherein the mold release agent facilitates the removal of cast articles from the mold cavity, yet without promoting flocculation of the slip during the slip casting process or adversely affecting the surface characteristics or the sintering behavior of the cast article such as by leaving a residue on the cast article.

SUMMARY OF THE INVENTION

It is an object of this invention to provide a mold release agent which is compatible with a porous ceramic mold for use in a slip casting process.

It is a further object of this invention that such a mold release agent be particularly suitable for casting submicron ceramic powders using a bisqued alumina mold.

Lastly, it is still a further object of this invention that such a mold release agent prevent flocculation of the slip during casting, facilitate the removal of cast articles from the mold cavity, and not adversely affect the surface characteristics or the sintering behavior of the cast article.

In accordance with a preferred embodiment of this invention, these and other objects and advantages are accomplished as follows.

According to the present invention, there is provided a mold release agent which is organic, in the form of a fine powder and/or fibers, and insoluble in the liquid vehicle of the slip composition to be cast. By example, when the slip is composed of ceramic particles dispersed in water, the preferred powder and/or fibers are chosen to be water-insoluble and are preferably suspended in water to form an aqueous suspension. The suspension can then be coated on the cavity surface of an absorbent ceramic mold by methods known in the prior art. Because the powders and fibers are insoluble in the slip's liquid vehicle, the powders and fibers will form a permeable barrier layer between the slip and the absorbent ceramic mold and will not react with the slip, yet will also allow transport of the liquid within the slip through to the porous ceramic mold. Furthermore, because the powders and fibers are organic, the mold release agent will be readily burned out during a subsequent firing or sintering operation, without leaving a residue on the sintered article or adversely affecting the behavior of the cast article during sintering.

The preferred material for the absorbent ceramic mold is a bisqued ceramic, such as bisqued alumina. Bisqued alumina molds exhibit excellent mechanical durability and chemical resistance, such that bisqued alumina molds have the capability for long service life, while also being suitable for slip casting processes conducted under pressure. Bisqued alumina molds are also capable of being formed to have sufficiently small pore sizes so as to be suitable for use with slips composed of submicron ceramic powders. Although bisqued alumina molds are preferred for these reasons, it is clear that the teachings of this invention are applicable to other suitable ceramic molds as well.

The slip casting method of this invention is substantially similar to that known in the prior art and includes providing a suitable mold pattern in the bisqued alumina mold, applying the mold release agent of this invention to the surface of the mold cavity, and pouring a suitable slip composition into the cavity. As stated above, the mold release agent of this invention substantially forms a permeable barrier layer between the bisqued alumina mold and the slip so as to promote release of the cast article from the mold cavity at the end of the slip casting process. Furthermore, the mold release agent of this invention is substantially nonreactive with the slip and is readily burned off during a subsequent sintering operation.

A significant advantage of the present invention is that the mold release agent permits the use of porous ceramic molds for the slip casting processes. These types of porous ceramic mold tend to be characterized by good durability, high strength and are typically nonreactive with the liquid medium used in the slip composition. Furthermore, the preferred bisqued alumina molds may be formed so as to be particularly suitable for casting slips which are composed of submicron-sized ceramic powders.

Other objects and advantages of this invention will be better appreciated from the following detailed description.

DETAILED DESCRIPTION OF THE INVENTION

A mold release agent which is suitable for use with ceramic molds in slip casting processes is provided in accordance with the teachings of this invention. The compatibility of the mold release agent of this invention with ceramic molds is contrary to conventional ammonium alginate-type mold release agents, which are generally incompatible with ceramic molds due to the chemistry and pore structure of ceramic molds. In addition, the mold release agent of this present invention is in the form of a suspension of particles and/or fibers, which is contrary to the ammonium alginate-type solutions known to the prior art.

Specifically, the mold release agent of this invention is composed of fine powders and/or fibers which are suspended in a liquid to form an organic solid material suspension. A preferred particle size range is about 0.1 to about 100 micrometers in diameter, with a more preferred range being about 1 to about 20 micrometers in diameter. A preferred fiber size range is about 1 to about 10,000 micrometers in length and about 0.1 to about 1000 micrometers in diameter, with a more preferred range being about 10 to about 100 micrometers in length and about 1 to about 10 micrometers in diameter.

The preferred suspension is preferably an aqueous suspension so as to be nontoxic, such that the suspension does not pose an environmental hazard in its use, recycling or disposal. In addition, because the organic powders and fibers must be water-insoluble to form the preferred aqueous suspension, the integrity of the mold release agent will not be degraded while in contact with conventional aqueous-based ceramic slips, in that the organic powders and fibers will not be prone to dissolving in the ceramic slip. However, the organic powders and fibers can be suspended in alcohols and ethers, as well as other liquids which are known and used in slip casting processes, as long as the organic powders and fibers are insoluble in the chosen suspension liquid and the liquid component of the slip.

The fine powders and fibers can be either natural or synthetic organic polymers, or a combination of the two. Examples of suitable natural water-insoluble polymers include starches, cotton fibers, and wood powders, fibers, and pulp. Examples of suitable synthetic water-insoluble polymers include main-chain acyclic carbon polymers, main-chain carbocyclic polymers, main-chain acyclic heteroatom polymers, main-chain heterocyclic polymers, regenerated cellulose and derivatives thereof. The above list is provided by way of example only and is not intended to be a comprehensive list of all possible natural or synthetic water-insoluble organic polymers which would be suitable for purposes of this invention.

Furthermore, natural and synthetic organic polymers suitable for use with this invention are limited only by the requirement that they be insoluble in the particular liquid vehicle chosen for a particular slip composition, such that the natural or synthetic organic polymers can form a permeable barrier between the slip composition and the slip mold. As a result, water-soluble organic polymers are entirely acceptable as long as they are in a nonaqueous suspension for use with a nonaqueous slip dispersion. Accordingly, mold release agents within the scope of this invention include all natural and synthetic organic polymers which are insoluble in liquids which are suitable for forming slips.

The preferred organic solid material suspension of this invention is preferably formed by homogeneously mixing the organic particles and/or fibers in water to form a suspension having a particle/fiber-to-water ratio of about 0.1 to about 70 volume percent. The ratio best suited for a particular application will depend on the materials used and the results desired and will be readily ascertainable by those skilled in the art. Once in suspension, the preferred water-insoluble organic particles and/or fibers can be readily applied to the surface of an absorbent ceramic mold suitable for use in a slip casting process. Suitable application methods are those known in the prior art, which include drain-casting, spraying, brushing or wiping, as well as other techniques which would result in the uniform distribution of the suspension to the mold surface.

The absorbent ceramic mold is preferably formed from a bisqued ceramic, and more preferably bisqued alumina ($Al_2O_3$). Although bisqued alumina molds are preferred, other ceramic materials may also be used. The use of the term "bisqued" is intended to indicate a ceramic mold which has been fired once but not glazed, such that the inherent porous nature of the ceramic mold provides a porous and, therefore, absorbent surface for the slip. Bisqued alumina molds are preferred because of their excellent physical and mechanical durability and chemical resistance, which enables the bisqued alumina mold to have a long service life capability. Bisqued alumina also exhibits sufficient strength so as to be suitable for pressurized slip casting processes. Another advantage of bisqued alumina molds is the ability to be formed with sufficiently small pore sizes, on the order of less than about 0.1 micrometer, so as to be suitable for use with slips composed of submicron ceramic powders. Generally, the submicron pores of a bisqued alumina mold are sufficiently small so as to substantially prevent a slip cast ceramic article from adhering to the mold cavity, even if the ceramic article is formed from a slip composed of submicron powders.

The bisqued alumina mold of this invention is preferably formed by partially sintering a compact, which has been slip cast from a slip composed of a uniform suspension of submicron alumina particles. The preferred bisqued alumina molds of this invention are adaptable to use with various slip casting techniques, which may be necessitated by the complexity of the cast article which is to be formed. Such variations include simple casting in one-piece or multiple-piece molds, drain casting, solid casting, vacuum casting, centrifugal casting, and casting with nonabsorbing pins and/or mandrels inserted into the mold. Each of the above are within the knowledge of one skilled in the art and therefore will not be described in detail here.

The preferred slip casting process includes applying a coating of the mold release agent to the surface of a mold cavity formed in the bisqued alumina mold. The coating may have a thickness in the range of about 5 to about 1000 micrometers, with a preferred thickness being about 50 to about 300 micrometers, although it is foreseeable that thicknesses outside of these preferred ranges may be achieved also. The preferred coating thickness for any given application will be somewhat dependent on the size of the particles and the diameter of the fibers used to form the mold release agent. Thereafter, the preferred slip casting process may be carried out under conventional conditions, which encompasses the variations in processing temperatures, pressures and durations that are required to sufficiently dry the slip to form the desired hollow or solid molded ceramic articles. These parameters will vary widely, depending on the particular application, and therefore are not intended to constitute a particular feature of this invention. In particular, those skilled in the art will recognize that slip casting processes typically require a trial-and-error methodology to determine the optimum parameters for a particular cast article which is required for a particular application.

As previously noted, solid articles are formed by allowing the entire slip mass to dry in the mold cavity, while hollow articles require draining the excess slip from the cavity after sufficient time has passed to form a suitably thick dry ceramic layer on the wall of the cavity. If the slip casting process is properly performed, the cast articles will exhibit sufficient "green", or unfired, strength to permit their removal from the mold cavity and subsequent handling. It is known in the prior art to use binders to promote the green strength of the cast articles, which may then be adequate to permit machining of the cast article. Conventionally, the cast articles undergo a firing or sintering operation to fuse and/or react the ceramic particles, thereby forming strong and dense solid ceramic articles. Again, firing and sintering operations are well known to those skilled in the art, and therefore are not intended to constitute a particular feature of this invention.

The following examples serve to further illustrate slip casting processes possible with the present invention. However, it should be understood that these examples are included merely for purposes of illustration and are not intended to limit the scope of the invention.

EXAMPLE 1

A corn starch powder, which is a water-insoluble organic material in accordance with the teachings of this invention, having a particle size ranging from about 10 to about 20 micrometers was tested as a mold release agent. The corn starch powder was mixed in cold water to form a 20 weight percent corn starch suspension. The suspension was then poured into the cavity of a bisqued alumina mold having a mold cavity with a cross-sectional area of about 0.8 $cm^2$. The pore sizes of the bisqued alumina mold ranged from about 0.02 to about 0.08 micrometers. The organic solid matter suspension was held in the mold cavity for a duration of about 20 seconds, after which the excess suspension was allowed to drain out. A layer of corn starch particles deposited to a thickness of about 80 to about 200 micrometers remained on the surfaces of the mold cavity. As one would expect, the thickness of this layer will depend in part on the water content of the bisqued alumina mold.

After the coating was dried in air at essentially room temperature for about 10 minutes, an aqueous slip composed of 82.9 weight percent alumina was poured into the mold cavity. The particle size range of the alumina particles was about 0.1 to about 0.6 micrometers. After about 15 minutes at room temperature, the slip had solidified, allowing the bisqued alumina mold to be opened and the cast article removed from the mold cavity. Advantageously and significantly, the cast article was able to be easily removed from the mold cavity.

The cast article did not exhibit any indications of surface or internal cracks. Examination of the green microstructure of the cast component using scanning microscopy confirmed that the use of the corn starch suspension as the mold release agent did not reduce particle-packing homogeneity, i.e., no flocculation of the slip occurred. Sintering at about 1520° C. for a duration of about 60 minutes resulted in the corn starch being completely burned out from the cast article, leaving no detectible residue. The sintered article did not exhibit any indications of surface or internal cracks. The grains on the surface of the sintered article were clearly developed, and the sintered article had an insignificant amount of porosity, on the order of about 0.5%. The microstructure of the sintered article appeared completely normal, indicating that the use of corn starch as a mold release agent would not adversely affect the sintering behavior of the cast article nor the grain growth of the sintered article.

EXAMPLE 2

Thin fibrous shreds of paper having a rough dimension of about 0.2×0.2 centimeters were mixed with water and pulverized in a blender to produce a paper fiber suspension having a fiber-to-water weight ratio of about 1:20. The paper fiber suspension was then poured onto the surface of a bisqued alumina plate whose pore sizes ranged from about 0.02 to about 0.08 micrometers. The paper fiber suspension formed a permeable barrier layer of fiber having a thickness of about 0.2 millimeters. The permeable barrier layer was then dried at room temperature for about 10 minutes.

An alumina slip composed of 82.9 weight percent alumina was poured onto the bisqued alumina plate. The particle size range of the alumina particles was about 0.1 to about 0.6 micrometers. After about 10 minutes at room temperature, the slip had solidified, and the cast article was easily removed from the surface of the bisqued alumina plate. No cracks were observed in the as-cast article, nor were cracks observed in the cast article after sintering for about one hour at about 1520° C.

EXAMPLE 3

Poly(vinyl butyral) particles, ranging in size from about 0.5 to about 10 micrometers, and polypropylene particles, ranging in size from about 10 to about 200 micrometers, were mixed with water to produce a polymeric suspension. The polymeric suspension was then poured onto the surface of a bisqued alumina mold to form a permeable barrier layer having a thickness of about 1000 millimeters. The polymeric particles were embedded on the surface of an alumina compact by slip casting an alumina slip composed of about 82.9 weight percent alumina in the bisqued alumina mold. The particle size range of the alumina particles was from about 0.1 to about 0.6 micrometers. The alumina slip was then dried at room temperature for a duration of about 24 hours on the bisqued alumina mold.

The resulting ceramic article then underwent heating at a rate of about 0.5° C./minute from about 80° C. to about 440° C., so as to sufficiently burn out the polymeric particles. The ceramic compact was then examined using mercury porosimetry and conventional microscopy for pore evaluation. Results indicated that the pore distribution was typical for the ceramic composition, except for large discrete pores corresponding in size to the embedded polymeric particles being formed at the surface of the compact, indicating that the synthetic organic polymers had no adverse effect on the microstructure of the ceramic compact, with no indications of surface or internal cracks and no detectible residue on the compact's surface.

Though the drying and casting temperatures for each of the above examples were generally at room temperature, it is foreseeable that the drying temperatures can differ as long as they are below the melting point of the organic material used as the solid component of the mold release agent and below the boiling point of the liquid used as the dispersion medium for the mold release agent. Furthermore, it is foreseeable that the casting temperatures can also vary according to the above criteria. The durations indicated above can also be varied, with a maximum allowable duration being dependent on the amount of water or other liquid vehicle used to formulate the mold release agent.

The post-casting processes may also be widely varied as required for a particular application, with only the requirement that the mold release agent be completely burned out. However, it is foreseeable that this aspect may also be disregarded to some degree under the proper circumstances.

The above examples illustrate that the mold release agents of this invention are highly compatible with slip casting processes using alumina molds. In particular, the mold release agents promote the release of cast ceramic articles from an alumina mold, while also being readily burned out during subsequent sintering operations so as not to leave an undesirable residue in or on the surface of the ceramic article. Furthermore, the mold release agents of this invention do not have an undesirable effect on the microstructure of the ceramic article, nor does their use result in any detectible surface or internal cracking of the cast article.

In addition, it can be seen that an advantage of the present invention is that the mold release agents of this invention permit the use of porous alumina molds in slip casting processes, so as to allow the use of more durable and stronger mold materials which are less prone to react with aqueous mediums often used in the slip composition. Furthermore, the preferred bisqued alumina molds are capable of being formed with submicron pores so as to be particularly suitable for casting slips composed of submicron-sized ceramic powders.

While our invention has been described in terms of a preferred embodiment, it is apparent that other forms could be adopted by one skilled in the art, for example by modifying the processing parameters such as the temperatures or durations employed, or by substituting appropriate natural or synthetic organic solids, or by utilizing alternative aqueous components in which the organic solids are suspended. Accordingly, the scope of our invention is to be limited only by the following claims.

The embodiments of the invention in which an exclusive property or privilege is claimed are defined as follows:

1. A method for slip casting ceramic articles from submicron ceramic powders, the method comprising the steps of:

providing an absorbent alumina mold having a cavity, the absorbent alumina mold having submicron pores formed therein so as to significantly reduce the tendency for a slip cast ceramic article to adhere to the cavity;

applying a mold release agent to a surface of the cavity, the mold release agent comprising a suspension of organic solids; and pouring into the cavity a quantity of powdered ceramic materials dispersed in a liquid so as to form the slip cast ceramic article therefrom, the powdered ceramic materials comprising submicron ceramic particles;

whereby the mold release agent substantially forms a permeable barrier layer between the absorbent alumina mold and the quantity of powdered ceramic materials, the permeable barrier layer being substantially nonreactive with the absorbent alumina mold and the quantity of powdered ceramic materials dispersed in the liquid, while also permitting passage of the liquid through to the absorbent alumina mold.

2. A method for slip casting ceramic articles as recited in claim 1 wherein the organic solids are selected from the group consisting of water-insoluble natural polymers and synthetic polymers.

3. A method for slip casting ceramic articles as recited in claim 1 wherein the organic solids have a particulate or fibrous form.

4. A method for slip casting ceramic articles as recited in claim 1 wherein a portion of the organic solids have a particulate form while the remainder of the organic solids have a fibrous form.

5. A method for slip casting ceramic articles as recited in claim 1 further comprising the step of sintering the ceramic article, wherein the organic solids leave substantially no residue on the ceramic article after the sintering step so as to produce a sintered compact exhibiting low porosity.

6. A method for slip casting ceramic articles as recited in claim 1 wherein the organic solids are suspended in water.

7. A method for slip casting ceramic articles as recited in claim 1 wherein the absorbent alumina mold is a bisqued alumina mold.

* * * * *